(No Model.) 3 Sheets—Sheet 1.
J. FLEMING.
POTATO HARVESTER.
No. 579,972. Patented Apr. 6, 1897.
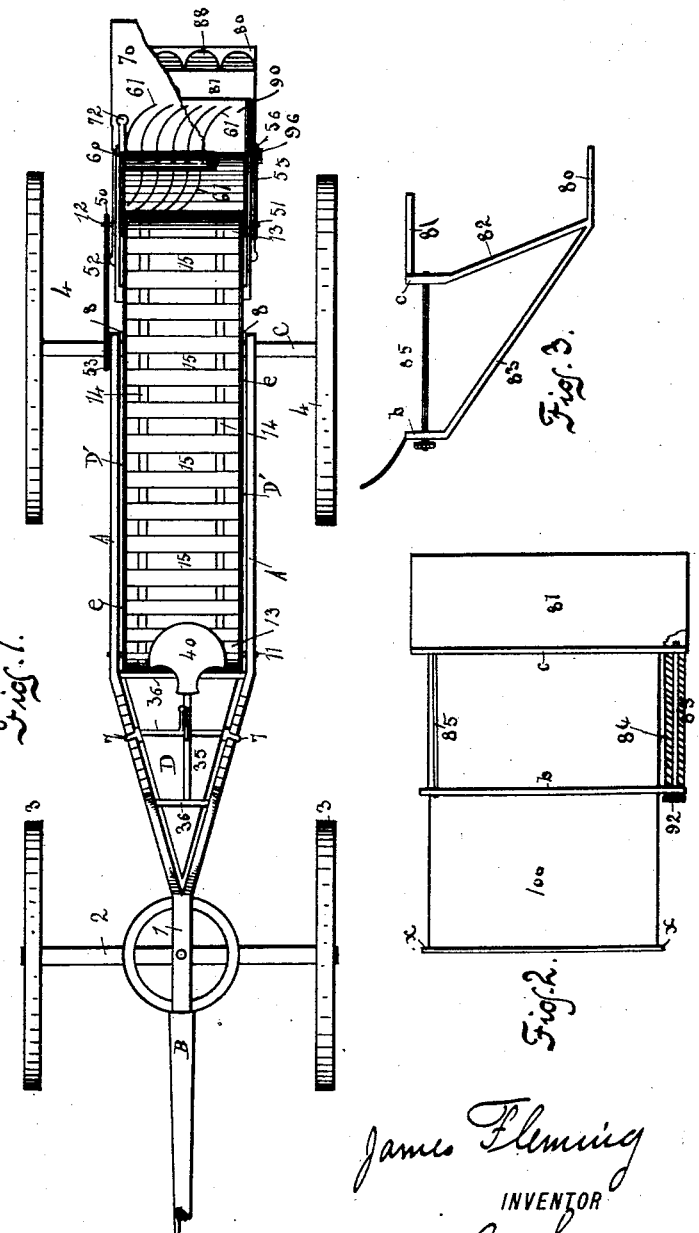

(No Model.) 3 Sheets—Sheet 2.
J. FLEMING.
POTATO HARVESTER.
No. 579,972. Patented Apr. 6, 1897.
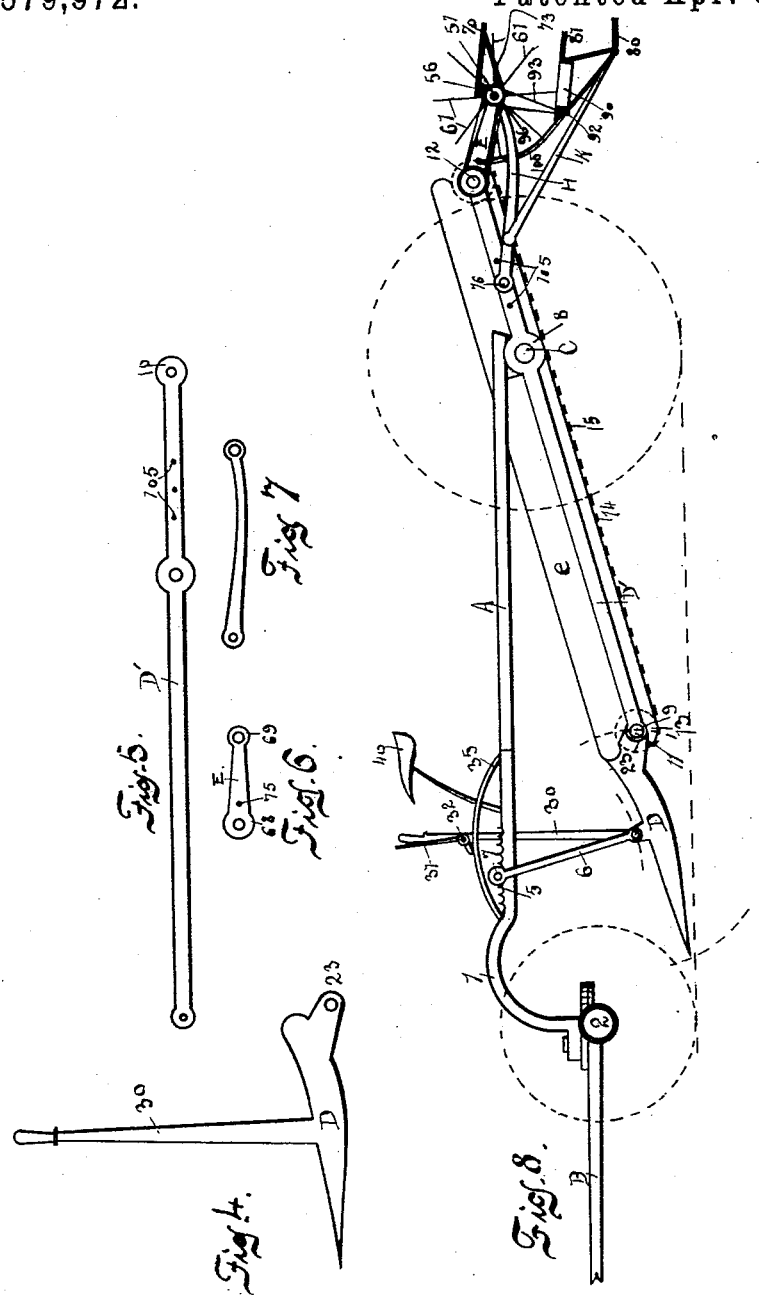
WITNESSES:
A. Elkjer
W. A. Webster
James Fleming
INVENTOR
BY G. H. Sues.
ATTORNEY.

(No Model.)  3 Sheets—Sheet 3.
J. FLEMING.
POTATO HARVESTER.
No. 579,972. Patented Apr. 6, 1897.
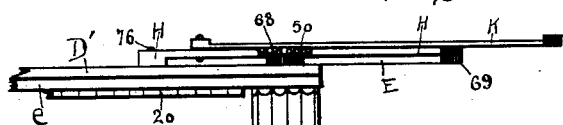
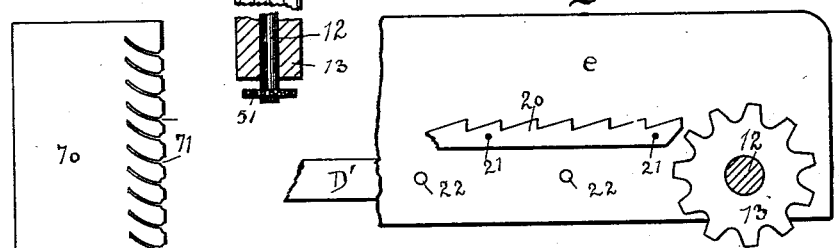
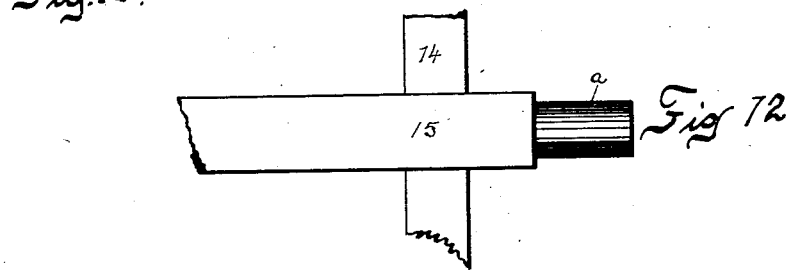
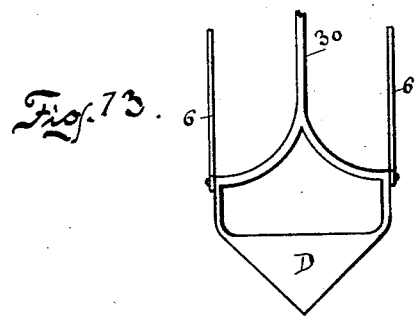
WITNESSES:
A. Elkjer
W. A. Webster
James Fleming
INVENTOR
BY
ATTORNEY.

UNITED STATES PATENT OFFICE.

JAMES FLEMING, OF OMAHA, NEBRASKA.

POTATO-HARVESTER.

SPECIFICATION forming part of Letters Patent No. 579,972, dated April 6, 1897.

Application filed August 13, 1896. Serial No. 602,694. (No model.)

*To all whom it may concern:*

Be it known that I, JAMES FLEMING, residing at Omaha, in the county of Douglas and State of Nebraska, have invented certain useful Improvements in Potato-Harvesters; and I do hereby declare that the following is a full, clear, and exact description of the invention, such as will enable others skilled in the art to which it appertains to make and use the same, reference being had to the accompanying drawings, which form a part of this specification.

This invention has relation to a potato-harvester.

The object of my invention is to provide a potato-harvester by means of which the potatoes are dug out of the ground and carried upon a sorting-apron, where the stones are separately collected, the potatoes being permitted to fall into receptacles provided for that purpose, the stones being deposited at a point adjoining the harvester.

My machine further embodies a weed or potato-vine remover by means of which the potato-vine is collected and separately deposited, so that it does not in any way interfere with the collection of the potatoes.

In the accompanying drawings, Figure 1 shows a top view of a potato-harvester, with parts broken away, embodying my invention. Fig. 2 is an enlarged end view of the apron-frame with a part broken away. Fig. 3 shows a top view of the apron-frame minus the apron. Figs. 4, 5, 6, and 7 show details of some of the parts as used in my invention. Fig. 8 shows a side elevation of my potato-harvester. Fig. 9 shows a detached enlarged broken top view of the main driving-drum. Fig. 10 shows a top view of the upper or vine platform. Fig. 11 shows an enlarged broken detail of the main driving-drum and a broken section of the agitating-rack. Fig. 12 shows a top view of a broken section of one of the main elevator-bars and connecting-strand, while Fig. 13 shows a front view of the shovel as used in my invention.

My device comprises, essentially, a supporting-frame comprising the frame-bars A A, which bars in front converge and terminate in the curved stem 1, which is secured to the fifth-wheel of the axle 2, provided with the wheels 3 3. To this front axle is secured the tongue B. At the rear the frame-bars A are united by means of the shaft C, which revolves within these frame-bars A A and which is provided with the supporting-wheels 4 4. In front these frame-bars are at a suitable point provided with the serrations 5, within which serrations are removably held the projecting pins 7 of the suspension-bars 6, which bars below are pivotally secured to the shovel D. Pivotally secured to and surrounding axle C are the elevator-bars D', which are provided with the bearings 8, as is shown in Fig. 8. These elevator-bars are further provided in front with the bearings 9 and in the rear with the bearings 10, (see Fig. 5,) within the frame of which is held the shaft 11, while the latter supports the shaft 12. These shafts 11 and 12 are provided with suitable drums 13, (shown in Fig. 9,) and which drums are corrugated, as disclosed. Passing over these drums 13 are two endless elevator-bands 14, supporting a series of elevator-bars 15, which bars terminate in rounded ends, as is shown in Fig. 12.

Projecting from the elevator-bars D' are the fenders *e*, which form a protection to the ends of the elevator-bars. Secured to these fenders *e* upon the inside are the serrated agitating-racks 20, secured by means of suitable pins 21, the fenders *e* being secured by means of the rivets or screws 22, as is shown in Fig. 11, and it is upon these rack-bars 20 that the rounded ends *a* of the elevator-bars work in carrying the potatoes and earth to the sorting-aprons.

The shovel D is provided upon the rear with the ears 23, within which is held the shaft 11, the shovel further being provided with an upwardly-projecting operating-handle 30, as shown, so that this shovel comes adjacent to the lower drum 13 and practically forms a continuation thereof. Above this operating-handle 30 is provided with an angular bar 31, secured by means of a pin 32 and which rests upon a curved bar 35, which bar is supported by means of the transverse bars 36, as is shown in Fig. 1, and from this bar 36 can further be extended the supporting-seat 40.

The shaft 12 is provided at one end with the chain-gear 50 and upon the end opposite with the chain-gear 51. The first gear is adapted to receive a chain 52, which passes over a pulley 53 upon the shaft C and by means of which rotary motion is imparted to the shaft 12. The gear 51 is adapted to receive a chain 55, which works over a pulley 56, (shown in Fig. 8,) by means of which rotary motion is imparted to a cylinder 60, which is provided with a number of sweeps 61, as is shown.

The gear 56 is mounted upon a shaft 57, which shaft supports the cylinder 60, so that as the harvester is moved forward this cylinder and the connected sweeps are made to revolve. The chain 52, which connects the shaft 12 to the axle C, is crossed, so that the rear drum 13 turns in a direction opposite to that of the wheel. This is necessary because the sweeps are intended to turn upward, so that they carry up the potato-vines and deposit them upon the upper table 70, which table (shown in Fig. 10) is provided with a number of incisions permitting the sweeps to pass through the same after they have deposited the vines upon this table. This table further is provided with a bar 72, as shown in Fig. 1, by means of which it is secured to the connecting-bars E, being supported below by means of a brace 73, which is secured to the lower part of the table and also fixed to the end of these bars E.

Secured to the elevator-bars D' are the arms H, which at one end are secured to the bars D' by means of the pins 76 (see Fig. 9) and at their forward end are secured to the bars E, which engage the shaft 12. The bars H further give support to the brace-bars K, which are made to support a framework comprising the lower table 80 and the upper table 81. (Shown in detail in Fig. 3.) These tables are connected by means of the panels 82 and 83, which are provided above with the straight portions *b* and *c*, supporting two similar shafts 85, to which shafts are secured the drums 84, over which passes an endless apron 90. One of these shafts 85 is provided with a pulley 92, adapted to receive a belt 93, passing over the upper pulley 96, mounted adjacent to the pulley 56, as is shown in Fig. 1. This lower apron 90 is of rubber, canvas, or other suitable material and is positioned slightly at an angle, as is shown in Fig. 8, and it is upon this apron that the potatoes, as well as the stones which are carried up by the elevator, are deposited. However, by nicely adjusting the position of this elevator 90 the heavier objects, such as the stones, will remain on the elevator and be carried lengthwise and deposited upon the ground upon the side of the harvester, while the potatoes, which are much lighter, roll off of this apron 90 over the table 81 and into suitable receptacles 88, (shown in Fig. 1.) in which the potatoes are collected.

A connection is made between the upper portion *b* and the elevator 14 by means of the curved sheet-metal connection 100, which is provided above with two pins *x*, which extend into the openings 75 of the bars E, (shown in Fig. 6,) so that there is a connection between the elevators 14 and 90. The sweeps 61 pass adjacent to this connection 100 and tend to agitate the potatoes in tearing the vines from the stems, so that the earth is also loosened, which sifts upon the elevator 90 and is deposited upon the side, the lighter potatoes rolling off of the table 81 to be properly gathered. By this arrangement it will be seen that the potatoes are collected by the shovel D, which shovel is given a nice adjustment by means of the extending handle 30, so that the shovel-point can be raised or depressed. Adjustment in a vertical plane of this shovel is further obtained by means of the hanging bars 60, which work within the corrugations 5. As the earth with the potatoes and vines is carried from the shovel upon the endless elevator 14 there is a continuous agitating and pounding of this elevator by virtue of the elevator-bars 15 dropping over the serrated rack 20, so that the potatoes are freed of the soil clinging to them until they reach the upper end of the elevator, where they drop and encounter the sweeps 61, which further agitate the potatoes and collect the vines and carry them upward to be deposited upon the upper table 70, from whence as they accumulate they drop to the ground. The potatoes, stones, and such clods of earth as were too large to be lost through the elevator from here roll upon a transversely-extending apron 90, where the potatoes, however, are permitted, by virtue of the angle at which this cylinder is positioned, to roll downward and off, while the heavier particles collected thereon are carried over the edge and are deposited upon the side of the harvester.

By means of the openings 105 within the bars D' the whole rear series of tables can be given various angles to accomplish the desired result.

Now, having thus described my said invention, what I claim as new, and desire to secure by United States Letters Patent, is—

1. The combination with a front and rear wheeled axle of a suitable frame, an endless elevator secured to said rear wheeled axle, a shovel pivotally secured to the lower forward end of said elevator, suspension-bars adjustably securing said shovel to said frame, an adjusting-lever extending from said shovel, a table-frame supporting a top, intermediate and lower table, a transverse endless apron secured in front of and forming a continuation of said intermediate table, a connecting-panel between said endless apron and said elevator and a sweep positioned below said upper table, said sweep being actuated by said endless elevator, said transverse endless apron being in belt connection with said sweep, said intermediate table and transverse apron being held at an angle, substantially as and for the purpose set forth.

2. The combination with a wheeled supporting-frame, of an elevator-frame movably supported within said wheeled frame, shafts within the upper and lower ends of said elevator-frame, an endless elevator passing over said shafts, one of said shafts being in belt connection with one of said supporting-wheels, a shovel pivotally secured to said lower shaft, suspension-bars adjustably securing said shovel to said supporting-frame, a controlling-handle secured to said shovel, an endless apron supported transversely below said elevator, said apron being actuated by said endless elevator, a table forming a continuation of said transverse endless apron and a sweep positioned above said endless apron, said sweep being actuated by said endless elevator, all arranged substantially as and for the purpose set forth.

In testimony whereof I affix my signature in presence of two witnesses.

JAMES FLEMING.

Witnesses:
GEO. W. SUES,
C. W. LYMAN.